(12) United States Patent
Askan et al.

(10) Patent No.: US 11,108,228 B2
(45) Date of Patent: Aug. 31, 2021

(54) ELECTRICAL PROTECTIVE CIRCUIT ARRANGEMENT

(71) Applicant: Eaton Intelligent Power Limited, Dublin (IE)

(72) Inventors: Kenan Askan, Vienna (AT); Michael Bartonek, Vienna (AT)

(73) Assignee: EATON INTELLIGENT POWER LIMITED, Dublin (IE)

( * ) Notice: Subject to any disclaimer, the term of this patent is extended or adjusted under 35 U.S.C. 154(b) by 234 days.

(21) Appl. No.: 16/252,754

(22) Filed: Jan. 21, 2019

(65) Prior Publication Data

US 2019/0229529 A1 Jul. 25, 2019

(30) Foreign Application Priority Data

Jan. 22, 2018 (DE) ..................... 10 2018 101 312.4

(51) Int. Cl.
*H02H 9/02* (2006.01)
*H01H 9/54* (2006.01)
*H02H 1/00* (2006.01)

(52) U.S. Cl.
CPC ............ *H02H 9/025* (2013.01); *H01H 9/542* (2013.01); *H01H 9/548* (2013.01);
(Continued)

(58) Field of Classification Search
None
See application file for complete search history.

(56) References Cited

U.S. PATENT DOCUMENTS

| 8,631,275 B2 * | 1/2014 | Opina, Jr. ............... | H02J 3/381 |
| | | | 714/13 |
| 2013/0201733 A1 * | 8/2013 | Divan .................. | H02M 5/225 |
| | | | 363/39 |

(Continued)

FOREIGN PATENT DOCUMENTS

| DE | 102014012828 A1 | 3/2016 |
| EP | 2320535 A1 | 5/2011 |

(Continued)

*Primary Examiner* — Jeffrey A Gblende
(74) *Attorney, Agent, or Firm* — Leydig, Voit & Mayer, Ltd.

(57) ABSTRACT

An electrical protective circuit arrangement includes: a first outer conductor path and a second outer conductor path, the first outer conductor path being arranged in parallel with the second outer conductor path in terms of circuit technology; a second semiconductor circuit arrangement arranged in the first outer conductor path; a first current measuring arrangement arranged in the first outer conductor path and being connected to a first electronic control unit, the first electronic control unit driving the second semiconductor circuit arrangement; a fourth semiconductor circuit arrangement arranged in the second outer conductor path; a second current measuring arrangement arranged in the second outer conductor path and being connected to a second electronic control unit, the second electronic control unit driving the fourth semiconductor circuit arrangement. The first electronic control unit and the second electronic control unit are connected in terms of communications technology.

11 Claims, 3 Drawing Sheets

(52) U.S. Cl.
CPC ..... *H02H 1/0007* (2013.01); *H01H 2009/543* (2013.01); *H01H 2009/544* (2013.01)

(56) References Cited

U.S. PATENT DOCUMENTS

| | | | | |
|---|---|---|---|---|
| 2013/0293193 A1* | 11/2013 | Gailla | ........................ | H02J 7/02 320/109 |
| 2014/0313628 A1 | 10/2014 | Häfner et al. | | |
| 2017/0020201 A1* | 1/2017 | Xiang | .................... | A61B 5/091 |
| 2017/0170654 A1 | 6/2017 | Asanza Maldonado | | |
| 2020/0321888 A1* | 10/2020 | Tobayashi | ............... | H02P 27/08 |

FOREIGN PATENT DOCUMENTS

| WO | WO 2011057675 A1 | 5/2011 |
|---|---|---|
| WO | WO 2015028634 A1 | 3/2015 |

* cited by examiner

ELECTRICAL PROTECTIVE CIRCUIT ARRANGEMENT

CROSS-REFERENCE TO PRIOR APPLICATION

Priority is claimed to German Patent Application No. DE 10 2018 101 312.4, filed on Jan. 22, 2018, the entire disclosure of which is hereby incorporated by reference herein.

FIELD

The invention relates to an electrical protective circuit arrangement.

BACKGROUND

Dividing electrical currents into several branches by parallel connection, whereby the entire current is divided into the individual parallel branches according to Kirchhoff's first law, is known.

Furthermore, so-called hybrid protective switching devices are known for example from WO 2015/028634 A1 of the applicant. Such hybrid switching devices have numerous advantages over conventional purely mechanical protective switching devices. However, it has been shown that it is not possible to increase the current carrying capacity of an electrical line or its emergency protection by switching hybrid switching devices in parallel in accordance with WO 2015/028634 A1. Certain peculiarities of the mechanical switching contacts and semiconductor elements installed in such switching devices lead to a considerable drift in the internal resistances of such parallel-connected hybrid switching devices, resulting at the same time also in drifts of the current distribution between such switching devices. Within a short time after the initial operation, this results in uneven current distribution.

SUMMARY

In an embodiment, the present invention provides an electrical protective circuit arrangement, comprising: a first outer conductor path and a second outer conductor path, the first outer conductor path being arranged in parallel with the second outer conductor path in terms of circuit technology; a second semiconductor circuit arrangement arranged in the first outer conductor path; a first current measuring arrangement arranged in the first outer conductor path and being connected to a first electronic control unit, the first electronic control unit being configured to drive the second semiconductor circuit arrangement; a fourth semiconductor circuit arrangement arranged in the second outer conductor path; and a second current measuring arrangement arranged in the second outer conductor path and being connected to a second electronic control unit, the second electronic control unit being configured to drive the fourth semiconductor circuit arrangement, wherein the first electronic control unit and the second electronic control unit are connected in terms of communications technology, and wherein the first electronic control unit is configured to control the second semiconductor circuit arrangement and the second electronic control unit is configured to control the fourth semiconductor circuit arrangement for adapting a first current across the first outer conductor path and a second current across the second outer conductor path, and/or wherein the first electronic control unit and the second electronic control unit are configured to switch off the second outer conductor path at a first current and/or a second current below a presettable limit value.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides an electrical protective circuit arrangement of the type mentioned above, with which the disadvantages mentioned above can be avoided, with which the current carrying capacity of an electrical protective circuit arrangement can simply be increased safely and permanently.

This makes it possible to connect several solid-state outer conductor paths in parallel, either within a single switching device or by connecting several switching devices in parallel, without it being possible for the entire current load or at least a predominant part of the current load to be handled by only one of the outer conductor paths involved. This prevents one of the outer conductor paths involved from ageing and failing faster than at least one other outer conductor path due to excessive power dissipation. This can also prevent a total failure of one of the outer conductor paths in the event of an emergency shutdown.

Figure 1:
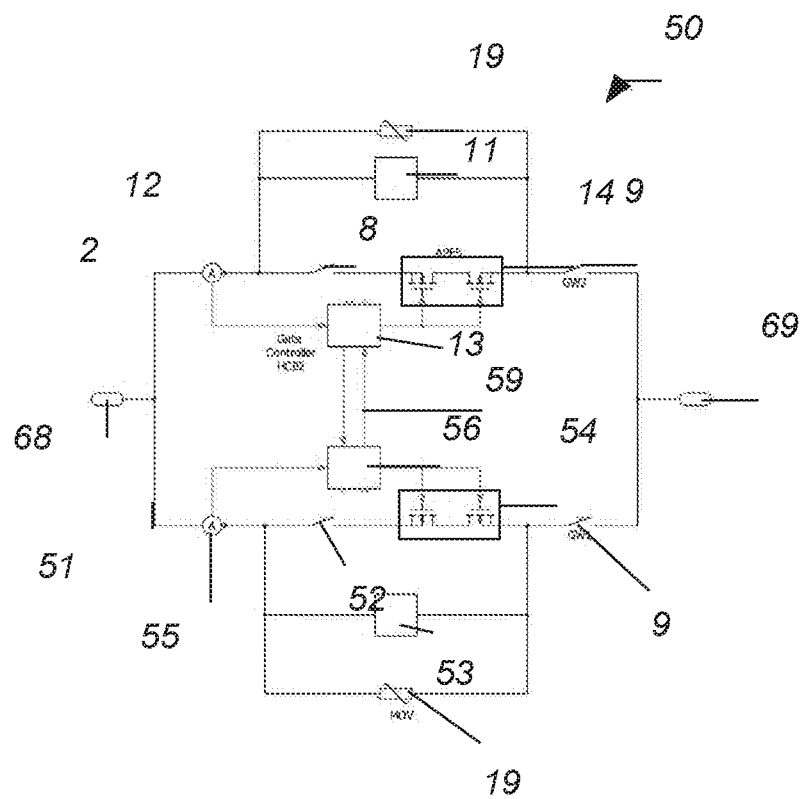
FIG. 1 shows a first embodiment of a concrete electrical protective circuit arrangement.
Figure 3:
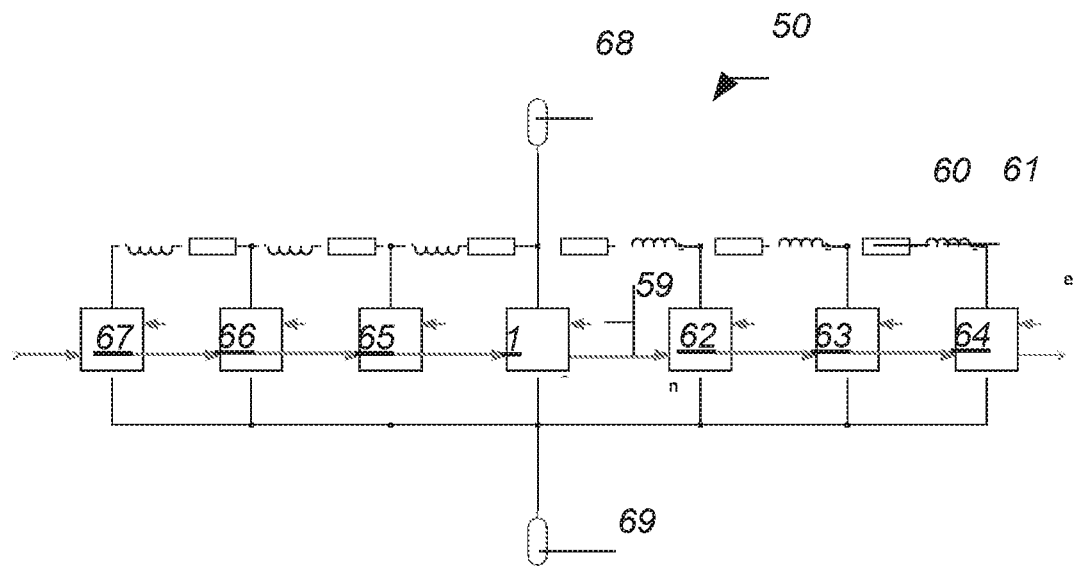
FIG. 3 shows a second embodiment of a concrete electrical protective circuit arrangement with seven low-voltage protective devices according to FIG. 2.

FIGS. 1 and 3 each show an electrical protective circuit arrangement 50 comprising a first outer conductor path 2 and a second outer conductor path 51, wherein the first outer conductor path 2 is arranged parallel to the second outer conductor path 51 in terms of circuit technology, wherein a first mechanical bypass switch 8 is arranged in the first outer conductor path 2, wherein a first semiconductor circuit arrangement 11 is connected in parallel with the first bypass switch 8, wherein a second semiconductor circuit arrangement 14 is arranged in the first outer conductor path 2 in series with the first bypass switch 8 and in parallel with the first semiconductor circuit arrangement 11, wherein a first current measuring arrangement 12 is arranged in the first outer conductor path 2, which is connected to a first electronic control unit 13, wherein the first electronic control unit 13 is adapted to drive the first bypass switch 8, the first semiconductor circuit arrangement 11 and the second semiconductor circuit arrangement 14, wherein a second mechanical bypass switch 52 is arranged in the second outer conductor path 51, wherein a third semiconductor circuit arrangement 53 is connected in parallel with the second bypass switch 52, wherein a fourth semiconductor circuit arrangement 54 is arranged in the second outer conductor path 51 in series with the second bypass switch 52 and parallel with the third semiconductor circuit arrangement 53 in terms of circuit technology, wherein a second measurement arrangement 55 is arranged in the second outer conductor path 51 which is connected with a second electronic control unit (56), wherein the second electronic control unit 56 is adapted to drive the second bypass switch 52, the third semiconductor circuit arrangement 53 and the fourth semiconductor circuit arrangement 54.

The first electronic control unit 13 and the second electronic control unit 56 are connected in terms of telecommunications technology, wherein the first electronic control unit 13 controls the second semiconductor circuit arrangement 14 and the second electronic control unit 56 controls the fourth semiconductor circuit arrangement 54 to adjust a first current across the first outer conductor path 2 and a second current across the second outer conductor path 51, and/or wherein the first electronic control unit 13 and the second electronic control unit 56 switch off the second outer conductor path 51 at a first current and/or a second current below a presettable limit value.

This makes it possible to connect several hybrid outer conductor paths 2, 51 in parallel, without it being possible for the entire current load or at least a predominant part of the current load to be handled by only one of the outer conductor sections 2, 51 involved. This can prevent one of the involved outer conductor sections 2, 51 from ageing and failing faster than the at least one other outer conductor section 2, 51 due to excessive power dissipation. This can also prevent a total failure of one of the outer conductor paths 2, 51 in the event of an emergency shutdown.

Figure 2:
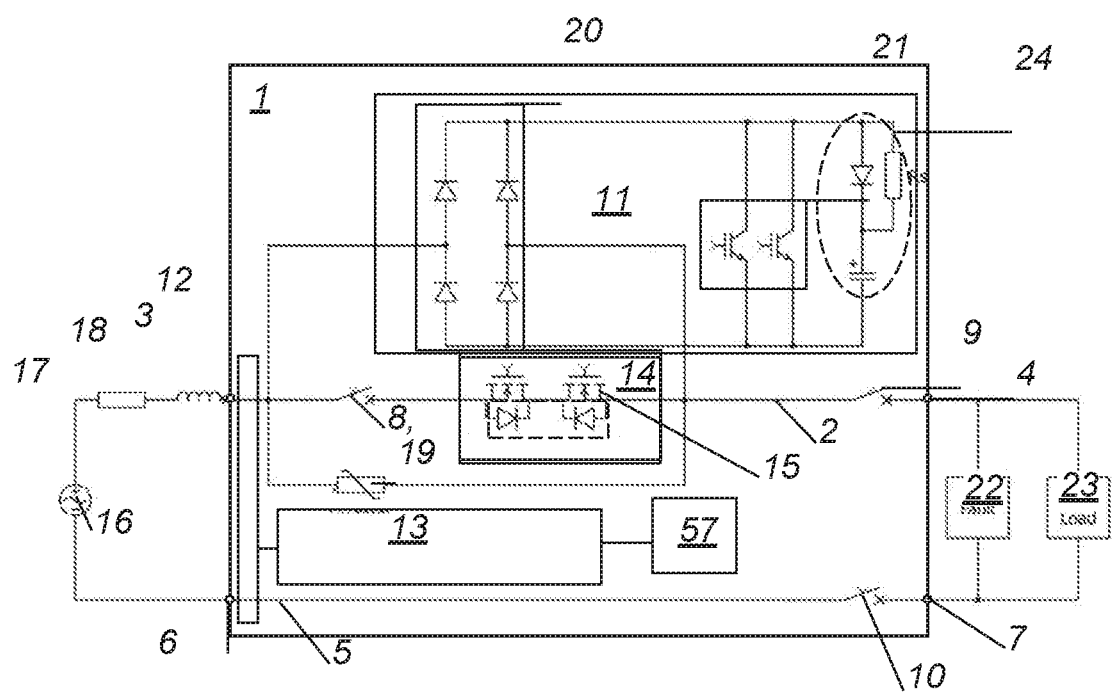
FIG. 2 shows a first embodiment of a discrete low-voltage protective switching device for a concrete electrical protective circuit arrangement.

The present device or arrangement according to FIGS. 1 to 3 concerns an electrical protective circuit arrangement 50, which can be implemented either by interconnecting several independent or autonomous or discrete low-voltage protective switching devices 1 or within a single protective switching device 1 designed accordingly.

In the introduction, the individual components required are described based on the low-voltage protective switching device 1 shown in FIG. 2. The relevant low-voltage protective switching device 1 shows the first of two outer conductor paths 2.

The present low-voltage protective switching device 1 and the protective switching device according to WO 2015/028634 A1 are low-voltage protective switching devices. As usual, low voltage refers to the range up to 1,000 V AC or 1,500 V DC.

The protective switching device 1 according to FIG. 2 has an outer conductor path 2 as well as a neutral conductor path 5. The first outer conductor path 2 runs through the protective switching device 1 from an outer conductor supply connection 3 to an outer conductor load connection 4. The neutral conductor path 5 runs through the protective switching device 1 from a neutral conductor connection 6 to a neutral conductor load connection 7. Each of the respective connections 3, 4, 6, 7 are preferably designed as screw terminals or plug-in terminals and are arranged in the protective switching device 1 accessible from outside.

The protective switching device 1 preferably has an insulating material housing.

A first mechanical bypass switch 8, preferably with simple contact interruption, is arranged in the first outer conductor section 2. The switch shown in FIG. 2 also has a first mechanical disconnector 9 arranged in series with the first bypass switch 8 in the outer conductor path 2. A second mechanical disconnector 10 is arranged in the neutral conductor path 5. A first semiconductor circuit 11 is connected in parallel with the first bypass switch 8.

Furthermore, a surge arrester 19 is connected in parallel to the first bypass switch 8.

The protective switching device 1 further has a first current measuring arrangement 12, which is arranged in the first outer conductor section 2, and which is preferably designed to comprise a shunt resistor.

The first current measuring arrangement 12 is connected to a first electronic control unit 13 of the protective switching device 1, which is preferably designed to comprise a microcontroller or microprocessor. The first electronic control unit 13 is designed to control the first bypass switch 8 and the first semiconductor circuit arrangement 11, as well as the first mechanical isolator switch 9 and the second mechanical isolator switch 10, and therefore actuate or switch them in a presettable manner. For this purpose, the first electronic control unit 13 is preferably connected, in terms of circuit technology, to the first semiconductor circuit arrangement 11, as well as further to, in particular electromagnetic, actuating elements of the mechanical switches, therefore the first bypass switch 8, the first mechanical isolating switch 9 and the second mechanical isolating switch 10. The corresponding connections starting from the first electronic control unit 13 are not shown in FIG. 2.

The first semiconductor circuit arrangement 11 has a rectifier circuit 20 in accordance with the embodiment in FIG. 2, which is preferably designed as a full bridge, and, in the case of the present embodiment, two power semiconductors 21, which are designed here as IGBTs, as actual switching or control elements. A larger power semiconductor 21 can also be provided. The device or arrangement in question is independent of the concrete implementation of the first semiconductor circuit arrangement 11.

In FIG. 2, the electrical environment is further indicated in addition to the actual protective switching device 1. The supply network is represented by the AC/DC network voltage source 16, the internal network resistance 17 and the network inductance 18. In addition, an electrical load 23 and an electrical fault 22 are shown in the form of a short circuit.

It is preferably provided that the first electronic control unit 13 is further adapted to operate the first mechanical circuit breaker 9.

It is also preferably provided that a second mechanical disconnector 10 is arranged in the neutral conductor path 5, and that the first electronic control unit 13 is preferably designed to actuate the second mechanical disconnector 10. Furthermore, an overvoltage arrester 19, in particular a varistor, preferably a MOV, is arranged in parallel with the first bypass switch 8 and the first semiconductor circuit arrangement 11, and preferably in series with the first disconnector 9, in terms of circuit technology. MOV stands for metal oxide varistor.

It is provided that in the first outer conductor path 2 a second semiconductor circuit arrangement 14 is arranged in series with the first bypass switch 8 and parallel with the first semiconductor circuit arrangement 11, in terms of circuit technology.

The second semiconductor circuit arrangement 14 can reduce the load on both the first bypass switch 8 and the first semiconductor circuit arrangement 11. This means that the current can be transformed to the first semiconductor circuit arrangement 11 even at significantly lower current levels than with conventional protective switching devices, thereby reducing the load on the first semiconductor circuit arrangement 11 and extending its service life. This essentially eliminates the occurrence of an arc at the first bypass switch 8 completely, thereby reducing the load on the corresponding switching contacts and extending their life.

Further advantages can be achieved through the measures in question.

Since there is no arc when switching off, no arc has to be extinguished either. No hot ionized gases are produced, which would have to be cooled first to prevent a new ignition of an arc. This can both reduce the load capacity of the first semiconductor circuit arrangement 11 and further accelerate the entire shutdown process, since there is no longer any need to fear that an arc will be ignited again here. Alternatively, the load capacity of the first semiconductor circuit arrangement 11 can remain unchanged and the opening speed of the first bypass switch 8 can be reduced, making it easier to design.

By quickly switching off a short-circuit or overload current, less energy is stored than usual in the form of leakage inductances or in the network inductance, which protects the first surge arrester 19 and the snubber 24. It can also be made smaller due to further effects.

Since there is no switch arc, the voltage drop at the first semiconductor circuit arrangement 11 is not limited by the arc voltage.

It is preferably provided that the second semiconductor circuit arrangement 14 and the fourth semiconductor circuit arrangement 54, respectively, are formed bidirectionally. Particularly preferably, the second semiconductor circuit arrangement 14 and the fourth semiconductor circuit arrangement 54 are configured as four quadrant circuits, for both current directions and both voltage polarities.

Furthermore, it is preferably provided that the second semiconductor circuit arrangement 14 and the fourth semiconductor circuit arrangement 54 are formed comprising low voltage MOSFET 15. The second semiconductor circuit arrangement 14 and the fourth semiconductor circuit arrangement 54 are constantly in current flow, which is why the internal resistance thereof is relevant to avoid excessive power dissipation at this location.

The low voltage MOSFET 15 is preferably chosen as 20-30V MOSFET due to its very low internal resistance and to keep the power dissipation low during regular operation. The voltage drop at the low voltage MOSFET 15 only serves to bring the current to convert to the first semiconductor circuit arrangement 11.

Due to the "intrinsic body diode" and operation of the MOSFET in the third quadrant, only two such low voltage MOSFET 15 are required for a bidirectional switch. Due to the high conductivity, high currents can be achieved at low gate voltages.

The first semiconductor circuit arrangement 11 is designed appropriately to withstand the high currents and voltage peaks in the event of a short circuit. The first semiconductor circuit arrangement 11 can be switched off as soon as the contacts of the bypass switch 8 have sufficient contact spacing.

The MOSFET 15 each have a preferred antiparallel diode, also known as a monolithic body diode.

It is further provided that the electrical protective circuit arrangement 50 has a first outer conductor path 2 and at least one second outer conductor path 51, which are arranged parallel to each other in terms of circuit technology.

A second mechanical bypass switch 52 is arranged in the second outer conductor path 51, wherein a third semiconductor circuit arrangement 53, which is formed in accordance with the first semiconductor circuit arrangement 11, is connected in parallel with the second bypass switch 52, wherein in the second outer conductor path 51 a fourth semiconductor circuit arrangement 54, which is designed in accordance with the second semiconductor circuit arrangement 14, is arranged in series with the second bypass switch 52 and in parallel with the third semiconductor circuit arrangement 53 in terms of circuit technology, wherein a second current measuring arrangement 55 is arranged in the second outer conductor path 51, analogously to the first current measuring arrangement 12, which is connected to a second electronic control unit 56 formed according to the first electronic control unit 13, wherein the second electronic control unit 56 is adapted to control the second bypass switch 52, the third semiconductor circuit arrangement 53 and the fourth semiconductor circuit arrangement 54. The designs for the components of the first outer conductor path 2 must be applied accordingly.

In particular, it is preferably provided that the first and second outer conductor sections 2, 51 are of the same design except for component tolerances.

The first electronic control unit 13 and the second electronic control unit 56 are connected for the transmission of data, in particular the respective current flow data, as well as for the transmission of control commands if necessary.

It is further provided that the first electronic control unit 13 controls the second semiconductor circuit arrangement 14, and the second electronic control unit 56 controls the fourth semiconductor circuit arrangement 54 to adjust a first current across the first outer conductor path 2 and a second current across the second outer conductor path 51. Such active control over the second and fourth semiconductor circuit arrangement 14, 54, respectively, allows the current flow over the first and second outer conductor lines 2, 51 to be adjusted. This prevents a one-sided overload of one of the branches.

In addition, or alternatively, it is provided that the first electronic control unit 13 and the second electronic control unit 56 switch off the second outer conductor path 51 at a first current and/or a second current below a presettable limit value. This means that one of the two outer conductor sections 2, 51 can be operated in stand-by mode and can only be switched on and operated only when required.

It is particularly preferably provided that the first and second electronic control units 13, 56 are designed to perform both tasks described.

It is preferably provided that the first electronic control unit 13 regulates a gate voltage of the second semiconductor circuit arrangement 14, and that the second electronic control unit 56 regulates a gate voltage of the fourth semiconductor circuit arrangement 54. This enables simple and efficient control of the second and fourth semiconductor circuit arrangements 14, 54, respectively.

According to a first preferred embodiment of an objective electrical protection circuit arrangement 50, it is provided that the first outer conductor path 2, the first mechanical bypass switch 8, the first semiconductor circuit arrangement 11, the second semiconductor circuit arrangement 14, the first current measuring arrangement 12 and the first electronic control unit 13 are arranged in a first low voltage protection switching device 1 comprising a first insulating material housing, as shown for example in FIG. 2. The relevant first low-voltage protective switching device 1 also has a first communication interface 57, which is connected to the first electronic control unit 13 in terms of communications technology.

The first communication interface 57 may in itself be designed according to any data transmission method. Preferably, it is provided that the first communication interface 57 is a wired interface, e.g. according to Ethernet, TCP/IP or EIB, whereby of course other methods or standards can also be used.

In accordance with the first preferred embodiment of an objective electrical protection circuit arrangement 50, it is also provided that the second outer conductor path 51, the second mechanical bypass switch 52, the third semiconductor circuit arrangement 53, the fourth semiconductor circuit arrangement 54, the second current measuring arrangement 55 and the second electronic control unit 56 are arranged in a second low-voltage protection switching device 62 comprising a second insulating material housing, that the second low-voltage protection switching device 62 has a second communication interface which is connected to the second electronic control unit 56 in terms of communications technology. The second low-voltage protective device 62 is also preferably designed in accordance with FIG. 2.

In accordance with the first preferred version of an objective electrical protection circuit arrangement 50, it is further provided that the first communication interface 57 is connected to the second communication interface in terms of communications technology. This allows different low-voltage protective switching devices 1, 62, 63, 64, 65, 66, 67 to be connected in parallel, depending on the requirements.

It is preferred that such a structure of discrete low-voltage protective devices 1, 62, 63, 64, 65, 66, 67 can be cascaded.

FIG. 3 shows a corresponding structure with a first low-voltage protective switching device 1, a second low-voltage protective switching device 62, a third low-voltage protective switching device 63, a fourth low-voltage protective switching device 64, a fifth low-voltage protective switching device 65, a sixth low-voltage protective switching device 66 and a seventh low-voltage protective switching device 67, whereby only the outer conductor connections are shown in each case, and also neutral conductor paths per low-voltage protective switching device 1, 62, 63, 64, 65, 66, 67 may be provided.

The individual low-voltage protective switching devices 1, 62, 63, 64, 65, 66, 67 are electrically connected to the common terminals 68, 69. FIG. 3 further shows line resistance 60 and line inductance 61.

According to a second preferred embodiment of an objective electrical protection circuit arrangement 50, it is provided that the first outer conductor path 2, the first mechanical bypass switch 8, the first semiconductor circuit arrangement 11, the second semiconductor circuit arrangement 14, the first current measuring arrangement 12 and the first electronic control unit 13, the second outer conductor path 51, the second mechanical bypass switch 52, the third semiconductor circuit arrangement 53, the fourth semiconductor circuit arrangement 54, the second current measuring arrangement 55, and the second electronic control unit 56 are arranged together in one and the same first low-voltage protective switching device 1, comprising a first insulating material housing, and that the first electronic control unit 13 is connected to the second electronic control unit 56 in terms of telecommunications, in particular circuit-wise. FIG. 1 shows a corresponding structure, which can already be implemented in this form, or can still be supplemented by a neutral conductor path 5.

In this context, it is preferably provided that the first electronic control unit 13 and the second electronic control unit 56 are formed in one piece, in particular at least partially in a common chip.

Furthermore, it is preferably provided that the electrical protective circuit arrangement 50 has at least one third outer conductor section, which is arranged in parallel with the first outer conductor section 2 and second outer conductor section 51 circuit-wise, although it is possible, of course, that further outer conductor paths are provided in parallel with the first and second outer conductor paths 2, 51.

Figure 5:
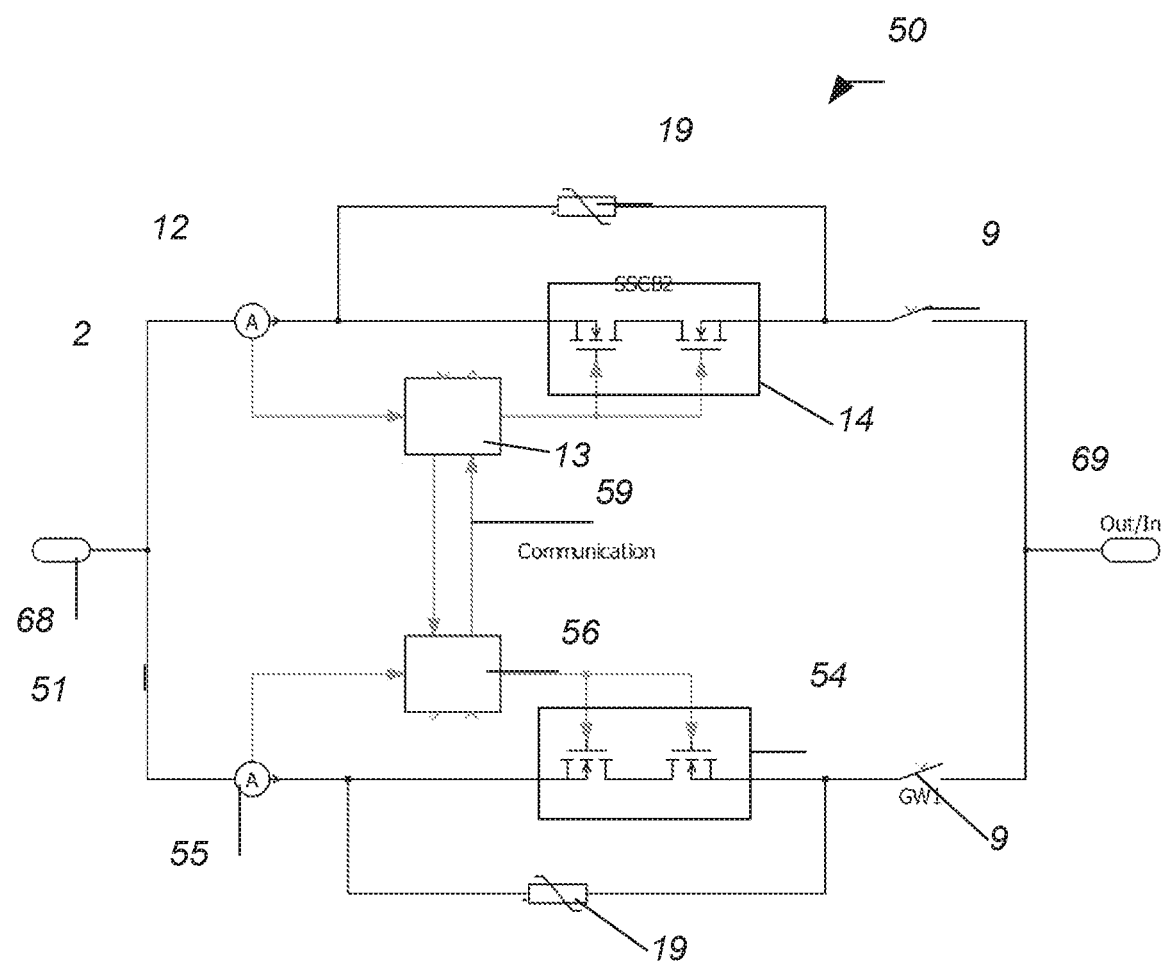
FIG. 5 shows a third embodiment of a concrete electrical protective circuit arrangement.

FIG. 5 shows a preferred further embodiment of an electrical protective circuit arrangement 50 comprising a first outer conductor path 2 and a second outer conductor path 51, wherein the first outer conductor path 2 is arranged circuit-wise parallel to the second outer conductor path 51, wherein a second semiconductor circuit arrangement 14 is arranged in the first outer conductor path 2, wherein a first current measuring arrangement 12 is arranged in the first outer conductor path 2, which is connected to a first electronic control unit 13, wherein the first electronic control unit 13 is adapted to drive the second semiconductor circuit arrangement 14, wherein a fourth semiconductor circuit arrangement 54 is arranged in the second outer conductor path 51, wherein in the second outer conductor path 51 a second current measuring arrangement 55 is arranged which is connected to a second electronic control unit 56, wherein said second electronic control unit 56 is adapted to drive the fourth semiconductor circuit arrangement 54, wherein the first electronic control unit 13 and the second electronic control unit 56 are connected in terms of communications technology.

The first electronic control unit 13 controls the second semiconductor circuit arrangement 14 and the second electronic control unit 56 controls the fourth semiconductor circuit arrangement 54 for adjusting a first current over the first outer conductor path 2 and a second current over the second outer conductor path 51, and/or wherein the first electronic control unit 13 and the second electronic control unit 56 switch off the second outer conductor path 51 at a first current and/or a second current below a presettable limit value.

This makes it possible to connect several solid-state outer conductor paths in parallel, either within a single switching device or by connecting several switching devices in parallel, without it being possible for the entire current load or at least a predominant part of the current load to be handled by only one of the outer conductor paths 2, 51 involved. This can prevent one of the involved outer conductor paths 2, 51 from ageing and failing faster than the at least one other outer conductor path 2, 51, due to excessive power dissipation. This can further prevent a total failure of one of the outer conductor paths 2, 51 in the event of an emergency shutdown.

All versions of the embodiments in accordance with FIGS. 1 to 3 are to be applied—unless they obviously contradict the electrical protective circuit arrangement 50 in accordance with FIG. 5. In particular, all designs relating to the operating environment and the preferred embodiments of the components involved are to be applied, which is why these preferred embodiments are not reproduced. These relate in particular to the implementation of the electrical protection circuit arrangement 50 in one or more devices.

Compared to the embodiment according to FIGS. 1 and 2, the electrical protective circuit arrangement 50 according to FIG. 5 has no first semiconductor circuit arrangement and no bypass switches. This is a so-called solid-state circuit breaker.

The nomenclature introduced at the beginning has been retained with regard to the designation of the individual semiconductor circuit arrangements.

Unlike the other embodiments, the second semiconductor circuit arrangement 14 and the fourth semiconductor circuit arrangement 54 are each configured to comprise high voltage MOSFET 15. These carry the complete switching load in this type of circuitry. Other types of semiconductors may also be provided, such as IGBT.

Figure 4:
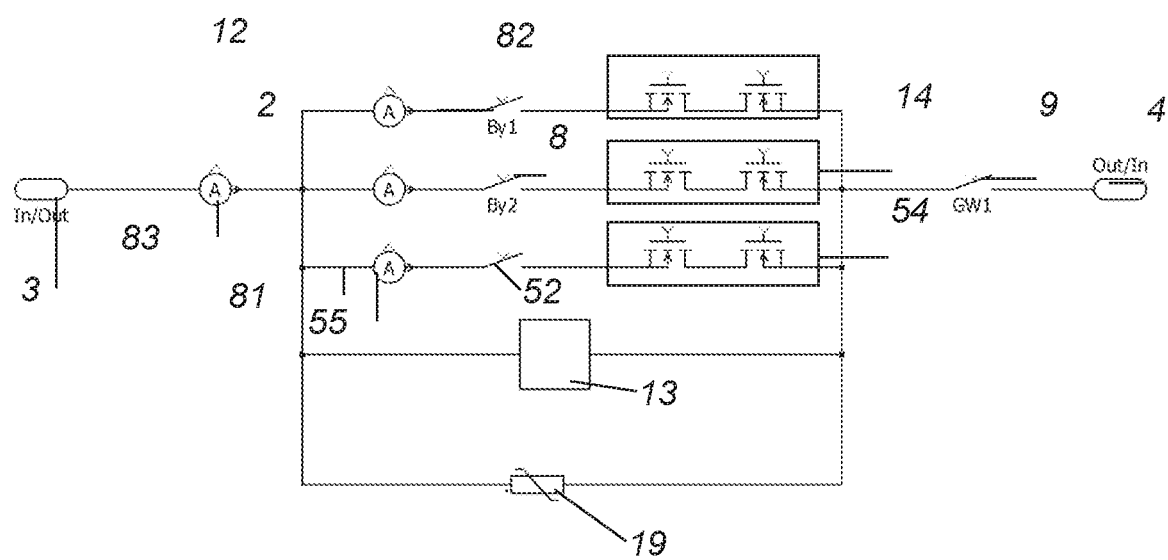
FIG. 4 shows a second embodiment of a discrete low-voltage protective device.

FIG. 4 shows a preferred embodiment of a low-voltage protective switching device 1 comprising a first outer conductor path 2 and at least one first bypass section 81, the first outer conductor path 2 being arranged circuit-wise parallel to the at least one first bypass section 81, a first mechanical bypass switch 8 being arranged in the first outer conductor path 2, a first semiconductor circuit arrangement 11 being connected parallel to the first bypass switch 8, wherein in the first outer conductor path 2 a second semiconductor circuit arrangement 14 is arranged circuit-wise in series with the first bypass switch 8 and parallel with the first semiconductor circuit arrangement 11, wherein in the first outer conductor path 2 a first current measuring arrangement 12 is arranged, which is connected to a first electronic control unit 13, wherein the first electronic control unit 13 is adapted to drive the first bypass switch 8, the first semiconductor circuit arrangement 11 and the second semiconductor circuit arrangement 14, a second mechanical bypass switch 52 being arranged in the first bypass section 81, a fourth semiconductor circuit arrangement 54 being arranged in series with the second bypass switch 52 circuit-wise in the first bypass section 81, wherein a second current measuring arrangement 55 is arranged in the first bypass section 81, which is connected to the first electronic control unit 13, wherein the first electronic control unit 13 is further adapted to drive the second bypass switch 52 and the fourth semiconductor circuit arrangement 54.

The first electronic control unit 13 controls the second semiconductor circuit arrangement 14 and the fourth semiconductor circuit arrangement 54 to adjust a first current over the first outer conductor path 2 and a second current over the first bypass path 81, and/or the first electronic control unit 13 switches off the first bypass path 81 at a first current and/or a second current below a presettable limit value.

This makes it possible to relieve a hybrid outer conductor path 2 by connecting at least one bypass section 81, 82 in parallel without it being necessary for the entire current load or at least a predominant part of the current load to be handled by only one of the paths 2, 81, 82 involved. This can prevent one of the paths involved from ageing and failing faster than at least one other path due to excessive power dissipation. This can also prevent a total failure in the event of an emergency shutdown.

All versions of the embodiments according to FIGS. 1 to 3 are to be used—unless they obviously contradict the low-voltage protective device 1 according to FIG. 4. In particular, all designs relating to the operating environment and the preferred embodiments of the components involved, which is why these preferred embodiments are not reproduced here.

In contrast to the embodiment according to FIGS. 1 and 2, the low-voltage protective device 1 according to FIG. 4 has only a single outer conductor path 2 comprising the first and second semiconductor circuit arrangements 11, 14.

Instead of further outer conductor paths, at least one first bypass section 81 is provided, which has a second current measuring arrangement 55, a second bypass switch 52 and a fourth semiconductor circuit arrangement 54.

According to FIG. 4, an appropriately designed second bypass section 82 is further provided, whereby further bypass sections may be provided.

The low-voltage protective switching device 1 also features a so-called global current measuring arrangement 83, which measures the total current before dividing it into partial currents and transmits it to the first control unit 13.

The nomenclature introduced at the beginning has been retained with regard to the designation of the individual semiconductor circuit arrangements.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An electrical protective circuit arrangement, comprising:
   a first outer conductor path and a second outer conductor path, the first outer conductor path being electrically coupled in parallel with the second outer conductor path;
   a second semiconductor circuit arrangement arranged in the first outer conductor path;
   a first current measuring arrangement arranged in the first outer conductor path and being connected to a first electronic control unit, the first electronic control unit being configured to drive the second semiconductor circuit arrangement;
   a fourth semiconductor circuit arrangement arranged in the second outer conductor path; and
   a second current measuring arrangement arranged in the second outer conductor path and being connected to a second electronic control unit, the second electronic control unit being configured to drive the fourth semiconductor circuit arrangement,
   wherein the first electronic control unit and the second electronic control unit are communicatively coupled, and
   wherein the first electronic control unit is configured to control the second semiconductor circuit arrangement and the second electronic control unit is configured to control the fourth semiconductor circuit arrangement for adapting a first current across the first outer conductor path and a second current across the second outer conductor path, or the first electronic control unit and the second electronic control unit are configured to switch off the second outer conductor path at a first current or a second current below a presettable limit value, wherein a first mechanical bypass switch is arranged in the first outer conductor path, wherein a first semiconductor circuit arrangement is connected in parallel with the first bypass switch, wherein the second semiconductor circuit arrangement is electrically coupled in series with the first bypass switch and is electrically coupled in parallel with the first semiconductor circuit arrangement, wherein the first electronic control unit is configured for this purpose, further to drive the first bypass switch and the first semiconductor circuit arrangement, wherein a second mechanical bypass switch is arranged in the second outer conductor path, wherein a third semiconductor circuit arrangement is connected in parallel with the second bypass switch, wherein the fourth semiconductor circuit arrangement is electrically coupled in series with the second bypass switch and is electrically coupled in parallel with the third semiconductor circuit arrangement, and wherein the second electronic control unit is configured to further drive the second bypass switch and the third semiconductor circuit device.

2. The electrical protective circuit arrangement according to claim 1, wherein the second semiconductor circuit arrangement and the fourth semiconductor circuit arrangement each comprise semiconductors.

3. The electrical protective circuit arrangement according to claim 1, wherein the second semiconductor circuit arrangement and the fourth semiconductor circuit arrangement are configured to be bidirectional.

4. The electrical protective circuit arrangement according to claim 2, wherein the first electronic control unit is configured to control a gate voltage of the second semiconductor circuit arrangement, and wherein the second electronic control unit is configured to control a gate voltage of the fourth semiconductor circuit arrangement.

5. The electrical protective circuit arrangement according to claim 1, wherein the first outer conductor path, the second semiconductor circuit arrangement, the first current measuring arrangement, the first electronic control unit, the second outer conductor path, the fourth semiconductor circuit arrangement, the second current measuring arrangement, and the second electronic control unit are arranged jointly in a first low-voltage protective switching device comprising a first insulating material housing, and wherein the first electronic control unit is communicatively connected to the second electronic control unit.

6. The electrical protective circuit arrangement according to claim 5, wherein the first electronic control unit and the second electronic control unit are configured as one piece.

7. The electrical protective circuit arrangement according to claim 1, wherein the electrical protective circuit arrangement further comprises at least one third outer conductor path, which is electrically coupled in parallel with the first outer conductor path and the second outer conductor path in terms of circuit technology.

8. The electrical protective circuit arrangement according to claim 2, wherein the semiconductors comprise MOSFETs.

9. The electrical protective circuit arrangement according to claim 3, wherein the second semiconductor circuit arrangement and the fourth semiconductor circuit arrangement each comprise a bidirectional 4-quadrant switch.

10. The electrical protective circuit arrangement according to claim 5, wherein at least a portion of the first electronic control unit and the second electronic control unit are arranged in a common chip.

11. An electrical protective circuit arrangement, comprising:

a first outer conductor path and a second outer conductor path, the first outer conductor path being electrically coupled in parallel with the second outer conductor path;

a second semiconductor circuit arrangement arranged in the first outer conductor path;

a first current measuring arrangement arranged in the first outer conductor path and being connected to a first electronic control unit, the first electronic control unit being configured to drive the second semiconductor circuit arrangement;

a fourth semiconductor circuit arrangement arranged in the second outer conductor path; and a second current measuring arrangement arranged in the second outer conductor path and being connected to a second electronic control unit, the second electronic control unit being configured to drive the fourth semiconductor circuit arrangement, wherein the first electronic control unit and the second electronic control unit are communicatively coupled, wherein the first electronic control unit is configured to control the second semiconductor circuit arrangement and the second electronic control unit is configured to control the fourth semiconductor circuit arrangement for adapting a first current across the first outer conductor path and a second current across the second outer conductor path, or the first electronic control unit and the second electronic control unit are configured to switch off the second outer conductor path at a first current or a second current below a presettable limit value, wherein the first outer conductor path, the second semiconductor circuit arrangement, the first current measuring arrangement, and the first electronic control unit are arranged in a first low-voltage protective switching device comprising a first insulating material housing, wherein the first low-voltage protective switching device comprises a first communication interface, which is communicatively connected to the first electronic control unit, wherein the second outer conductor path, the fourth semiconductor circuit arrangement, the second current measuring arrangement, and the second electronic control unit are arranged in a second low-voltage protective switching device comprising a second insulating material housing, wherein the second low-voltage protective switching device has a second communication interface which is communicatively connected to the second electronic control unit, and wherein the first communication interface is communicatively connected to the second communication interface.

* * * * *